METHOD FOR PRODUCING A MOLD FOR USE IN THE FABRICATION
OF BACKLIT PROJECTION SCREENS

Filed Sept. 10, 1962 3 Sheets-Sheet 1

PAUL C. ROBISON
INVENTOR, DECEASED
BY
ELAINE C. ROBISON,
ADMINISTRATRIX
BY Allen E. Botney
ATTORNEY PAUL C. ROBISON
INVENTOR, DECEASED
BY
ELAINE C. ROBISON,
ADMINISTRATRIX
BY Allen E. Botney
ATTORNEY PAUL C. ROBISON
INVENTOR, DECEASED
BY
ELAINE C. ROBISON
ADMINISTRATRIX
BY Allen E. Botney
ATTORNEY United States Patent Office 3,189,670

Patented June 15, 1965

3,189,670

METHOD FOR PRODUCING A MOLD FOR USE IN THE FABRICATION OF BACKLIT PROJECTION SCREENS

Paul C. Robison, deceased, late of Pacific Palisades, Calif., by Elaine C. Robison, administratrix, Pacific Palisades, Calif., assignor to FMA, Inc., El Segundo, Calif., a corporation of California Filed Sept. 10, 1962, Ser. No. 222,718
2 Claims. (Cl. 264—226)

This application is a continuation-in-part of the application entitled "Backlit Projection Screen and Process Therefor," Serial No. 135,286, filed August 31, 1961, now abandoned.

The present invention relates in general to those projection screens onto which a picture or image is projected from the rear and more particularly relates to a new method for making molds utilized for making such screens.

It will at once be recognized that when an image is projected onto one side of a screen and viewed from the opposite side, it is desirable that the projected light be scattered in a forward direction only, that is, toward the viewer, since, by eliminating back scattering of the light, the micro contrast of the image is very greatly improved, which means that a much sharper image is produced.

It is, therefore, an object of the present invention to provide a method for the manufacture of a mold for a backlit projection screen that substantially eliminates internal reflections.

It is another object of the present invention to provide a process for the manufacture of a mold for a backlit projection screen having properties such that the micro contrast of pictures presented on it are greatly improved.

The scattering in a forward direction only of light projected onto the screen from the rear is achieved by means of a layer of tiny randomly distributed hemispherical lenses on one face of the screen. The surface of the screen having these minute lenticular hemispheres or protuberances thereon is the projection surface, the picture or light image being projected onto the viewing surface through the screen from the rear.

Basically, in fabricating a projection screen having these minute lenses on one face thereof, a mold is used to form a model whose surface contains tiny spheres from which the hemispherical lenses on the screen surface will ultimately evolve. More specifically, a large number of tiny spheres are mixed with a dilute solution of an epoxy adhesive that will cause them to adhere to one another. This mixture or slurry is then poured into the abovesaid mold and the solvent allowed to evaporate. Thereafter, the mold and its contents are baked until the epoxy solidifies. Consequently, when the mold is removed, the model that is left is completely covered on one of its surfaces with these tiny spheres that are partially embedded in it. Over this model is poured a substance that will provide a final mold and it is into this final mold that the material from which the screen is going to be made is poured. Finally, when the screen material is suitably cured, we have a screen with a layer of tiny hemispheres on its surface which act as small lenses that scatter light in a forward direction only, thus eliminating unwanted back scattering, reducing internal reflections, and improving the micro contrast.

The steps and apparatus mentioned are substantially basic to several different approaches that may be taken in the manufacture of such a backlit projection screen. Accordingly, the novel features which are believed to be characteristic of the invention, together with further objects and advantages thereof, will be better understood from the following description considered in connection with the accompanying drawings in which several methods and the apparatus therefor are illustrated by way of example. It is to be expressly understood, however, that the drawings are for the purpose of illustration and description only and are not intended as a definition of the limits of the invention.

Figure 1:
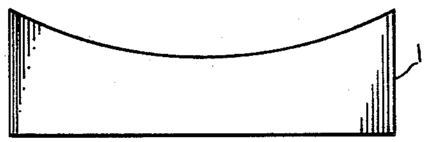
FIGURE 1 is an illustration of a female mold.

Referring now to the drawings, a cup-shaped mold 1 made of an easily machined material to which epoxy doesn't stick is shown in FIG. 1, Teflon, polyethylene and silicone rubber being examples of such a material. It should also be mentioned that although the mold is shown cup-shaped, it actually may have any shape, depending upon the ultimate use of the screen.

Figure 2:
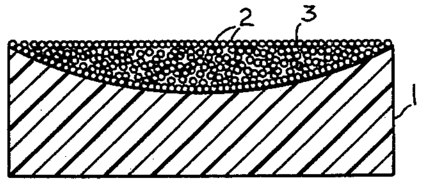
FIGURE 2 is an illustration of the female mold together with the slurry of tiny spheres in the adhesive.

In FIG. 2, mold 1 is filled with a large number of tiny spheres 2 that are mixed with a dilute solution of an epoxy adhesive 3 that will cause these spheres to adhere to one another. This mixture or slurry is poured into the mold, the solvent is allowed to evaporate, and the mold and its contents are then baked until the epoxy solidifies, thereby forming the male mold shown in FIG. 3 which includes the epoxy adhesive and a layer of the tiny spheres randomly distributed on its surface. More specifically, in forming the male mold, a greatly diluted epoxy solution is first provided, namely, a solution whose consistency is approximately that of water. Once the solution is provided, it is poured into mold 1 along with the beads, until the mold 1 is filled with the beads in solution. The epoxy solvent is then evaporated, as by curing, until the epoxy becomes hard. When these steps are followed, it has been found that the male mold of FIG. 3 will then have the desired hemispherical surface made up of the tiny spheres randomly distributed on its surface, as was previously mentioned.

Figure 4:
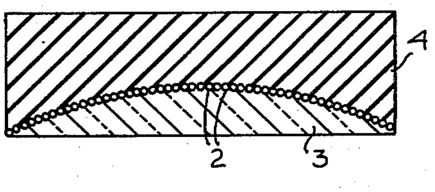
FIGURE 4 is an illustration of the intermediate male mold together with the final mold made from it.
Figure 5:
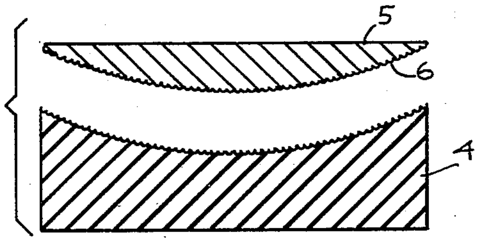
FIGURE 5 is an illustration of the final mold and the projection screen produced with it.

FIG. 4 shows a substance 4, such as silicone rubber or other resilient material, poured over this intermediate male mold to form a final mold. Assuming substance 4 to be silicone rubber, the silicone rubber mold, shown once again in FIG. 5, is used to cast of suitable material 5 a screen with a layer of randomly distributed hemispheres 6 on one of its surfaces, which surface would be the projection surface of the projection screen.

Figure 6:
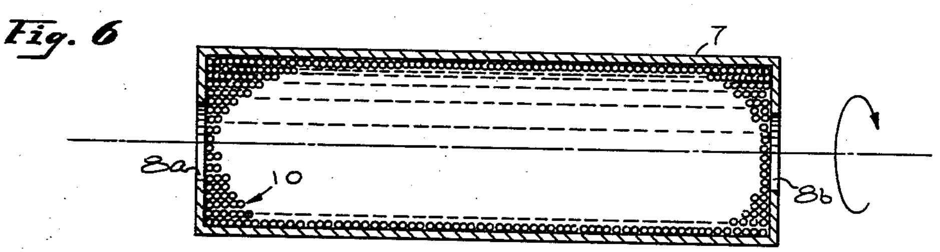
FIGURE 6 illustrates a cylindrically-shaped female mold together with the first steps of a second technique that may be used in the manufacture of a backlit projection screen.

Considering now FIGS. 6 through 12 which relate to a second method for the production of a backlit projection screen, reference is made in particular to FIG. 6 wherein is shown a cylindrical housing 7 having openings 8*a* and 8*b* at its ends. Cylinder 7 is mounted on a machine that rotates it around its long axis at an appropriate speed, the machine not being shown in the figure because the use of a machine for such rotational purposes and the manner in which the cylinder might be mounted on such a machine are relatively simple matters and, furthermore, the machine is not part of this invention. A slurry or mixture of the tiny spheres and the epoxy solution is poured into cylinder 7 through one of the openings while it is rotating. The mixture is generally designated 10 and the speed of rotation of the cylinder is intentionally made high enough so that the resulting centrifugal forces cause the slurry to press up against the wall of the cylinder, thereby causing the slurry itself to assume a cylindrical shape, that is, to form a cylinder within a cylinder. The rotation of cylinder 7 with the slurry in it is continued until the solvent in the epoxy solution evaporates and the epoxy adhesive surrounding the tiny spheres harden. When this point is reached, the rotation of the cylinder is stopped.

Figure 7:
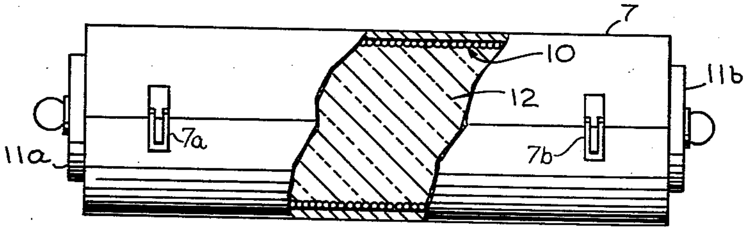
FIGURE 7 illustrates the step in this further technique for producing an intermediate female mold from which the final mold is to be made.
Figure 8:
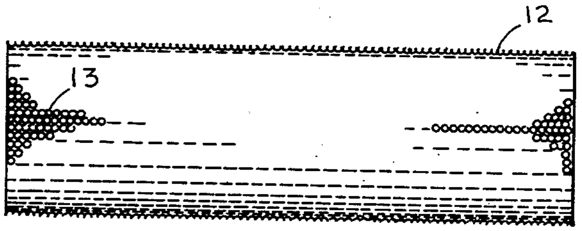
FIGURE 8 is an illustration of the abovesaid intermediate female mold.

Attention is now directed to FIG. 7 wherein cylinder 7 and male mold 10 are shown once again. At this point in the process, a lid 11*a* is inserted in one of the openings, for example, opening 8*a*, and the entire volume of space inside the male mold is filled with a low melting material 12 which, in addition, will not adhere to epoxy or glass. After being packed into the space mentioned, a second lid 11*b* is inserted in opening 8*b*. The Epolene thus contained will harden in due time, after which cylinder 7 and male mold 10 are removed from the hardened Epolene core 12 whose entire surface is now covered with tiny randomly distributed hemispherical recesses 13 due to the fact that during the course of its hardening it was in intimate contact with the tiny spheres of the mold. The hardened and cylindrically-shaped Epolene core with its entire surface covered with these tiny hemispherical recesses is shown in FIG. 8. With respect to removing cylinder 7 and male mold 10 from core 12, the cylinder 7 is removed first and this can be done simply by loosening the latches or fasteners 7*a* and 7*b* which hold the two halves of the cylinder together, as is shown in FIG. 7. After this, the male mold is removed and this can be done simply by cutting it slightly on its end and then pulling or ripping it apart. Mold 10 is so thin that it will easily tear apart.

Figure 9:
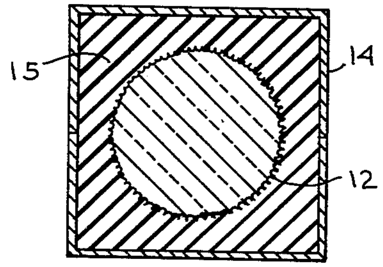
FIGURE 9 is an illustration of the step and apparatus involved in this further technique for producing an intermediate male mold.
Figure 10:
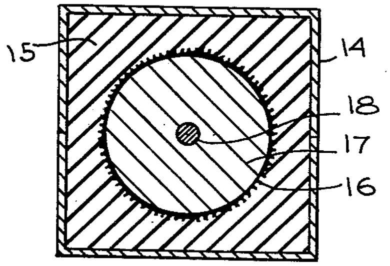
FIGURE 10 is an illustration of the step and apparatus involved in the manufacture of the final male mold.

As is shown in FIG. 9, the hardened Epolene core 12 is then centrally mounted in another housing structure 14 and into this structure, in the space between the Epolene mold 12 and the walls of structure 14, is injected a resilient material 15 to which the Epolene and the structure won't stick, such as a silicone rubber compound. When mold 12 is completely surrounded by the silicone rubber compound, the combination is then cured until the silicone rubber substance hardens or solidifies. The silicone rubber mold is then removed either by stripping it from the Epolene mold or by melting the Epolene and then pouring it out.

Having gotten rid of the Epolene material, a metal layer 16, such as copper, is now deposited on the inner surface of the silicone rubber core, copper being preferred because it is relatively inexpensive and because it faithfully follows the contours of a surface. As a result, the outside surface of the copper, that is to say, the surface that is in contact with the silicone rubber material, also contains and is covered by randomly distributed hemispherical recesses throughout its entire surface. Following the formation of the copper layer, the space enclosed by the layer is then completely filled with either a plastic or metal filler 17, such as lead, a shaft 18 also being provided at this time. Once the filler hardens, be it a plastic or metal, the Silastic mold is removed, thereby leaving a solid roller, generally designated 20 in FIG. 11, whose entire surface is covered with the desired hemispherical recesses.

Figures 11, 12:
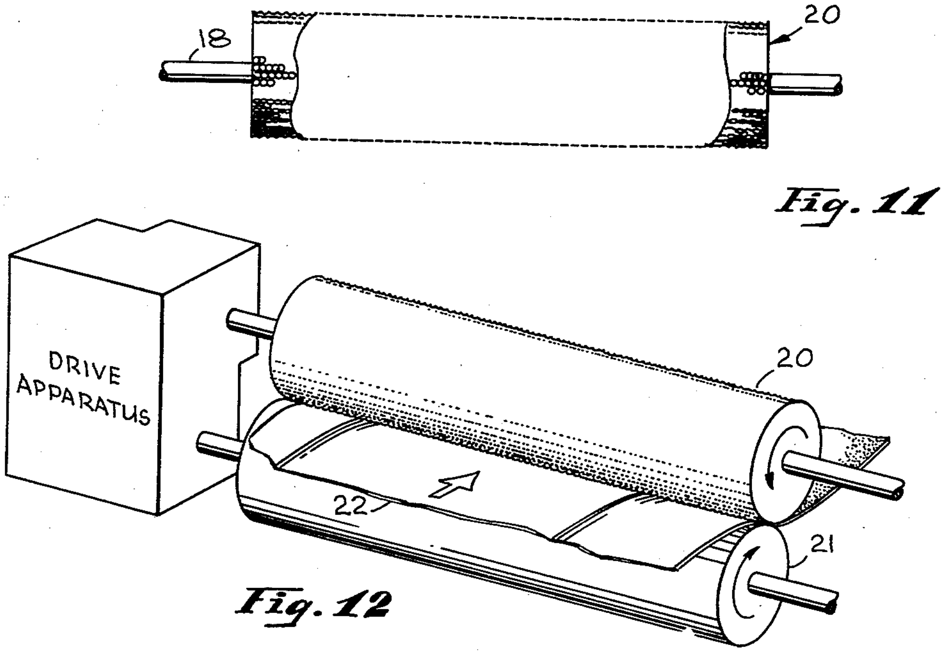
FIGURE 11 is an illustration of the final cylindrical male mold.
FIGURE 12 illustrates the manner in which the final male mold shown in FIG. 11 is used in the fabrication of a backlit projection screen.

This roller, together with another smooth-surfaced roller 21, may now be used to manufacture a backlit projection screen upon whose projection surface is found the desired layer of randomly distributed hemispherical lenses that will scatter the light in a forward direction only. The two rollers and a strip of projection screen material 22 moving forward between the rollers in the direction of the arrow are shown in FIG. 12.

Figure 13:
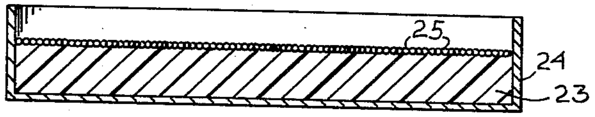
FIGURE 13 illustrates the first steps and apparatus of a third approach that may be used in the manufacture of a backlit projection screen.
Figure 14:
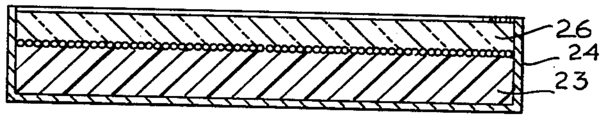
FIGURE 14 illustrates the intermediate steps involved in this third approach and shows the screen material deposited over a layer of uniformly distributed tiny spheres.
Figure 15:
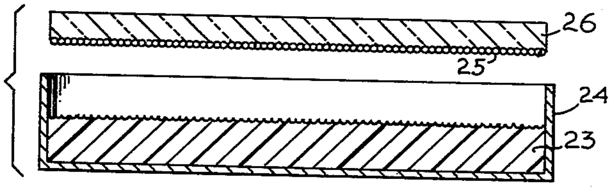
FIGURE 15 illustrates the final steps in the third approach mentioned, as a result of which a screen having tiny hemispherical lenses uniformly distributed throughout its face is produced.

A third technique for constructing a backlit projection screen having the desired features and the means used in this third technique are shown in FIGS. 13, 14 and 15. More particularly, in accordance with this third approach, a material known by its trade name of RTV–60, which is manufactured by the General Electric Company, is appropriately mixed with a catalyst as directed on the container in which the RTV–60 material is sold. Similarly, a material known by its trade name LTV–602, also manufactured by General Electric, is also mixed with an appropriate catalyst as directed on its container. Equal amounts of RTV and LTV by weight are then mixed or poured together, any air that may have been trapped therein being taken out by any one of the existing well-known techniques.

This mixture of RTV–60 and LTV–602, designated 23, is then poured into a level tray 24 as shown in FIG. 13. When this is done, the tray and its contents are cured until such time that spheres deposited on the surface of the cured mixture sink or become immersed only to a radial distance below the surface of the mixture. In order to determine the point in time during the curing process when this phenomenon occurs, the mixture in the tray is tested at frequent intervals. Less curing time is required at the higher curing temperatures to bring the consistency of the mixture to the proper point whereas more curing time is needed at the lower curing temperatures.

When the consistency of the mixture is such that the tiny spheres will become only half immersed, the spheres are then brushed onto the surface of the mixture, the step of brushing them continuing until the entire mixture surface is covered with them. Surplus spheres are then removed, by brushing them away or otherwise, leaving the combination shown in FIG. 13 wherein the spheres are designated 25. The curing of the mixture is then continued until it solidifies, after which a layer of epoxy 26 is spread over the layer of spheres as is shown in FIG. 14, the entire combination then being cured some more until the epoxy itself has solidified. When the curing is over, the now solid layer of epoxy is pulled off and when this is done the tiny spheres, which have become cemented to the epoxy, are removed and stay with the epoxy layer, as is clearly illustrated in FIG. 15.

Figure 3:
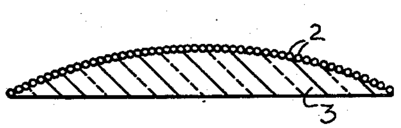
FIGURE 3 is an intermediate male mold of the adhesive material and the tiny spheres embedded in its surface.

The epoxy-sphere layer is a male mold comparable to the male mold shown in FIG. 3. Accordingly, from it a projection screen can be produced using the steps previously delineated in connection with FIGS. 4 and 5. On the other hand, the RTX–LTV mixture remaining in the tray after the spheres have been removed may itself be used as the final mold as was final mold 4 in FIG. 5, the screen in this case, being manufactured by pouring the screen material into the tray and then solidifying it.

With respect to the tiny spheres referred to above, the diameter of these spheres may be from less than 1 micron to more than 30 microns depending upon the resolution requirements. Thus, for example, a resolution of 160 lines per millimeter requires spheres of about 7 microns in diameter. The spheres themselves may be made of any material but the use of glass spheres or beads are preferred since they are commercially available in this diameter range. In the matter of the solution with which the spheres are mixed to form a slurry, the solution itself is a mixture of an epoxy resin and an epoxy solvent. Although anyone of several different epoxy solvents may be used, the preferred solvent is methyl ethyl ketone, commonly known as Ketone, and it is preferred because it evaporates rapidly, without boiling, at room temperatures.

Curing is preferably at room temperatures and conducted overnight. However, curing can also be accomplished at above room temperatures and, therefore, at reduced curing times. Where the curing is overnight and at room temperature and where a flat-surfaced projection screen is top casted, it has been found that the most favorable ratio of spheres to epoxy, by weight, is 2.3 to 1. With knowledge of the abovesaid ratio and also knowing how many grams of these tiny spheres are needed per square centimeter of projection screen surface, the total sphere weight and the total epoxy weight many then be easily determined.

More specifically, knowing how many grams of these tiny spheres are required per square centimeter of screen surface, the total weight of the spheres that must be used is found by multiplying this figure by the area of the screen surface contemplated. Then, in accordance with the sphere-epoxy ratio specified above, the answer obtained from this multiplication is divided by 2.3 in order to obtain the total weight of the epoxy that must be used.

By way of a concrete example, it will be assumed that 100 square centimeters of projection screen surface area is involved and that 7 micron spheres are to be employed. Consequently, with the assumptions made, 0.026 gram of these 7 micron spheres are needed per square centimeter of screen area. Hence, a total of 2.6 grams of these 7 micron spheres are required. Accordingly, by dividing the figure 2.6 by the figure 2.3, the total weight of epoxy required is found to be a little more than 1 gram. Having set aside the total epoxy needed as determined by these computations, sufficient Ketone is then mixed with the epoxy to make its viscosity low enough so as to permit the solution to mix easily with the spheres. In other words, sufficient Ketone is added to the epoxy so that it can be poured like water over the spheres to form the desired slurry.

As previously mentioned, the figures used above are for a top-casted flat-surfaced projection screen. However, where the flat-surfaced screen is bottom casted, the figures to be used are slightly modified. Thus, for bottom casting, the ratio of sphere weight to epoxy weight is 3.5 to 1 rather than the 2.3 to 1 previously specified. Again, the sphere weight per unit screen area is 0.031 gram per square centimeter instead of 0.026 gram per square centimeter indicated earlier. Thus, making the same assumptions as before and following through with the same computations, the total weight of 7 micron spheres required for a flat-surfaced 100 square centimeter screen is 3.1 grams. The weight of the epoxy, on the other hand, is determined by dividing 3.1 grams by 3.5, which is found to be slightly under 1 gram. Here again, once the proper amounts of spheres and epoxy are obtained, sufficient Ketone is then added to the epoxy so that the mixture can be easily poured.

In the examples presented by way of illustration, the figures and ratios used are not critically related to the 7 micron diameter of the spheres. Accordingly, substantially the same figures and ratios would be involved for spheres of somewhat different size. Also, substantially the same figures and ratios would apply to other than flat-surfaced screens as, for examples, concave or convex surfaced screens, as illustrated in FIG. 5.

Although several different methods have been illustrated and explained above by way of example, it will be recognized that the invention is not limited thereto. Accordingly, the invention should be considered to include any and all modifications, alterations or equivalent arrangements of the methods herein described without departing from the scope of the annexed claims. Hence, by way of example, the processes herein described can be adapted for the manufacture of a highly effective lens, concave or convex, on which one surface is covered with these very much smaller lenses. Moreover, the screen (or lens) can be made and will function just as well if its surface is covered with hemispherical recesses instead. In other words, hemispherical recesses are the optical equivalent of the hemispherical protuberances. It will be obvious that where the recesses are used, the final mold will be the male mold and, therefore, it will contain and be covered with the tiny partially imbedded spheres.

Finally, it was mentioned several times earlier that the tiny spheres and the hemispheres or recess formed from them are randomly distributed. This is an important feature of the invention since when they are formed in a regular pattern, such as lines and rows, a diffraction grating effect is produced in the screen that distorts the image. The random distribution of the spheres and the resulting random distribution of the lenses on the screen surface prevents this diffraction grating effect.

Having thus described the invention, what is claimed is:

1. A method of forming apparatus from which a rear illuminated projection screen may be produced, said method comprising the steps of: constructing a first female mold having a smooth surface of desired configuration from a suitable material; placing in said female mold a mixture consisting of a large number of tiny spherical bodies, together with an amount of adhesive solution to form a slurry of said spherical bodies, said slurry drying to form a male mold or prototype whose surface is covered with said spherical bodies; removing said male mold from said female mold and using a resilient material to mold a second female mold over said male mold; removing said male mold from said second female mold, said second female mold comprising a surface that is dimpled by the spherical bodies.

2. A method of forming apparatus by which a rear illuminated projection screen may be produced, said method including the steps of: constructing a first female mold of material that will retain a viscous material therein, said viscous material being a multitude of small spherical bodies in a quantity of a bonding medium, said medium bonding said spherical bodies one to another, said viscous material solidifying to form a male mold having a layer of spherical bodies on the surface thereof; said male mold being used to form a female mold by obtaining an impression of the surface of said male mold with a resilient material, thus causing the female mold to have a multitude of concave hemispheres contiguous with one another on one of its surfaces.

References Cited by the Examiner

UNITED STATES PATENTS

| | | | |
|---|---|---|---|
| 2,064,322 | 12/36 | Ruppert | 88—28.90 |
| 2,143,946 | 1/39 | Hunter | 88—28.90 |
| 2,218,909 | 10/40 | Gill | 264—1 |
| 2,442,598 | 6/48 | Harrison et al. | 264—284 |
| 2,454,910 | 11/48 | Carr | 264—112 |
| 2,928,131 | 3/60 | Mahler | 264—164 |
| 3,114,597 | 12/63 | Lee | 264—1 |

FOREIGN PATENTS

| | | |
|---|---|---|
| 484,620 | 7/52 | Canada. |

ALEXANDER H. BRODMERKEL, *Primary Examiner.*

ROBERT F. WHITE, *Examiner.*